(12) United States Patent
Balbach et al.

(10) Patent No.: US 10,259,720 B2
(45) Date of Patent: Apr. 16, 2019

(54) ABRASIVE COATED SUBSTRATE AND METHOD FOR MANUFACTURING THEREOF

(71) Applicant: GENERAL ELECTRIC TECHNOLOGY GMBH, Baden (CH)

(72) Inventors: Werner Martin Balbach, Wuerenlingen (CH); Wilhelm Ebeling, Niederrohrdorf (CH); Matthias Hoebel, Windisch (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 429 days.

(21) Appl. No.: 14/955,605

(22) Filed: Dec. 1, 2015

(65) Prior Publication Data

US 2016/0160661 A1 Jun. 9, 2016

(30) Foreign Application Priority Data

Dec. 5, 2014 (EP) .................................... 14196596

(51) Int. Cl.
*F01D 5/28* (2006.01)
*C01F 7/02* (2006.01)
(Continued)

(52) U.S. Cl.
CPC ............ *C01F 7/02* (2013.01); *B23K 26/0006* (2013.01); *B23K 26/034* (2013.01); *B23K 26/34* (2013.01);
(Continued)

(58) Field of Classification Search
None
See application file for complete search history.

(56) References Cited

U.S. PATENT DOCUMENTS

| 3,520,656 A * | 7/1970 | Yates ................... C04B 35/575 |
| | | 423/345 |
| 4,169,020 A * | 9/1979 | Stalker ...................... F01D 5/20 |
| | | 205/110 |

(Continued)

FOREIGN PATENT DOCUMENTS

| DE | 10 2010 049 399 A1 | 5/2011 |
| EP | 1 707 650 A1 | 10/2006 |
| EP | 1 840 245 A1 | 10/2007 |

OTHER PUBLICATIONS

European Search Report dated Apr. 13, 2015, by the European Patent Office for Application No. 14196596.2:0.

(Continued)

*Primary Examiner* — Jason D Shanske
*Assistant Examiner* — Brian Christopher Delrue
(74) *Attorney, Agent, or Firm* — Buchanan Ingersoll & Rooney PC

(57) ABSTRACT

A coated substrate is described including a substrate material, which is coated at least in part with an oxidation-resistant coating, wherein the coating consists of a wear-resistant abrasive coating layer, which contains or consists of coated abrasive particles embedded in an oxidation-resistant matrix material, wherein at least some of the abrasive particles consist of $\alpha$-$Al_2O_3$ and the abrasive particles are coated with a first particle coating layer disposed on the abrasive particles and an optional second particle coating layer disposed on the first particle coating layer, wherein the matrix material contains or consists of the compound MCrAlY, wherein M is at least one element selected from the group consisting of Ni, Co and Fe. A method for manufacturing such a coated substrate is also disclosed.

20 Claims, 4 Drawing Sheets

(51) Int. Cl.
*B23K 26/00* (2014.01)
*C09D 1/00* (2006.01)
*C23C 28/02* (2006.01)
*B23K 26/03* (2006.01)
*B23K 26/34* (2014.01)
*B32B 15/01* (2006.01)
*F01D 11/12* (2006.01)
*C09K 3/14* (2006.01)
*C09K 15/04* (2006.01)
*C23C 24/10* (2006.01)
*C09D 7/62* (2018.01)
*C08K 9/02* (2006.01)
*C08K 3/22* (2006.01)
*B23K 101/00* (2006.01)
*B23K 103/08* (2006.01)
*B23K 103/18* (2006.01)

(52) U.S. Cl.
CPC ............... *B32B 15/01* (2013.01); *C09D 1/00* (2013.01); *C09D 7/62* (2018.01); *C09K 3/1436* (2013.01); *C09K 15/04* (2013.01); *C23C 24/103* (2013.01); *C23C 28/022* (2013.01); *C23C 28/027* (2013.01); *F01D 11/122* (2013.01); *B23K 2101/001* (2018.08); *B23K 2103/08* (2018.08); *B23K 2103/26* (2018.08); *C08K 9/02* (2013.01); *C08K 2003/2227* (2013.01)

(56) References Cited

U.S. PATENT DOCUMENTS

| | | | | |
|---|---|---|---|---|
| 4,289,503 | A * | 9/1981 | Corrigan | B01J 3/062 51/307 |
| 4,582,548 | A * | 4/1986 | Harris | C22C 19/057 148/404 |
| 4,643,782 | A * | 2/1987 | Harris | C22F 1/10 148/404 |
| 4,861,673 | A * | 8/1989 | Hara | B22F 7/06 428/469 |
| 4,885,216 | A * | 12/1989 | Naik | C22C 19/056 148/404 |
| 5,106,266 | A * | 4/1992 | Borns | F01D 5/28 416/241 R |
| 5,366,695 | A * | 11/1994 | Erickson | C22C 19/057 420/448 |
| 6,811,898 | B2 * | 11/2004 | Ohara | C23C 6/00 428/472.1 |
| 6,966,956 | B2 * | 11/2005 | Koizumi | C22C 19/057 148/428 |
| 8,163,403 | B2 * | 4/2012 | Zurbuchen | C30B 25/10 117/84 |
| 8,647,073 | B2 | 2/2014 | Hoebel et al. | |
| 8,877,122 | B2 * | 11/2014 | Aoki | C22C 19/05 420/444 |
| 9,581,041 | B2 * | 2/2017 | Sinatra | F01D 11/122 |
| 9,868,667 | B2 * | 1/2018 | Riman | C04B 14/043 |
| 2002/0151265 | A1 * | 10/2002 | Adefris | B24D 3/18 451/490 |
| 2003/0183529 | A1 | 10/2003 | Ohara et al. | |
| 2004/0180233 | A1 * | 9/2004 | Stamm | C22C 19/055 428/680 |
| 2009/0117390 | A1 | 5/2009 | Stamm et al. | |
| 2009/0202814 | A1 | 8/2009 | Jabado et al. | |
| 2011/0103967 | A1 * | 5/2011 | Hoebel | B23K 35/304 416/241 R |
| 2011/0164961 | A1 | 7/2011 | Taylor | |
| 2011/0164963 | A1 | 7/2011 | Taylor | |
| 2013/0108421 | A1 | 5/2013 | Sinatra et al. | |
| 2013/0122259 | A1 * | 5/2013 | Lee | C23C 30/00 428/164 |

OTHER PUBLICATIONS

Mingxi Li et al., Microstructure of $Al_2O_3$ Nanocrystalline/Cobalt-Based Alloy Composite Coatings by Laser Deposition, Materials and Design, vol. 27, Jan. 1, 2006, pp. 1114-1119, XP027891370.

Office Action (First Office Action) dated Nov. 29, 2018, by the Chinese Patent Office in corresponding Chinese Patent Application No. 201510886627.6, and an English Translation of the Office Action. (14 pages).

\* cited by examiner

ABRASIVE COATED SUBSTRATE AND METHOD FOR MANUFACTURING THEREOF

TECHNICAL FIELD

The present invention relates to a coated substrate comprising a substrate material, which is coated at least in part with an oxidation-resistant coating, wherein the coating consists of or comprises a wear-resistant abrasive coating layer, which consists of coated abrasive particles embedded in an oxidation-resistant matrix material. The invention also relates to a manufacturing method thereof. Such substrate materials can, for example, consist of a single-crystalline superalloy, wherein the substrate material is a radially extending turbine blade for a turbine rotor, and wherein the coating is applied at the radially outer blade tip surface.

BACKGROUND OF INVENTION

During transient processes, such as start, restart, shutdown or load changes in gas turbines and compressors, the distance between the rotor blades and the static components, such as heat-shields, are varying. Commonly, a rubbing of the rotor blades is circumvented by a sufficiently high distance between the rotor blades and the static components. This measure reduces the efficiency considerably.

As an alternative, oxidation- and wear-resistant abrasive coatings are applied at the rotor blade tips to prevent wear of the turbine blades upon contact with the static components, especially with the heat shields. These abrasive coatings contain abrasive particles, thereby enhancing wear resistance such that a sufficient protection of the turbine blades is provided, even if the static components are provided with a thermal barrier coating (TBC). Regularly, the abrasive particles consist of cubic boron nitride (cBN) as for example disclosed in DE 10 2010 049 399 A1. Because of its morphology and extremely high hardness, cBN has a superior cutting ability. However, at operating temperatures above 800° C. to 850° C. cBN is oxidizing with the result that a protective effect of an abrasive coating can only be provided for a very short time. cBN particles in abrasive coating can only guarantee a sufficient protection for about 1000 operation hours at temperatures above 900° C. Above 900° C. cBN particles are degraded rapidly by the oxidation process. Especially in the first turbine stages of a gas turbine, the temperatures can be between 900° C. to 1300° C.

SUMMARY OF INVENTION

Therefore, the object of the present invention is to provide a coated substrate that provides a long-term protection of substrate materials at elevated temperatures against wear and oxidation, and which can be produced relatively easily and fast.

The task is solved by the subject-matter of claim 1. Accordingly at least some of the abrasive particles, advantageously all of the abrasive particles, consist of $\alpha$-$Al_2O_3$, wherein the abrasive particles are coated with a first particle coating layer disposed on the abrasive particles. Optionally, a second particle coating layer is disposed on the first particle coating layer. Furthermore, the matrix material of the abrasive coating consists of or comprises the oxidation-resistant compound MCrAlY, wherein M is at least one element selected from the group consisting of Ni, Co and Fe.

$\alpha$-$Al_2O_3$, known as the minerals corundum or sapphire, is extremely stable against oxidation, being itself already an oxide. Although, it is less hard than cBN and possesses a lower cutting efficiency, $\alpha$-$Al_2O_3$, still has a sufficient hardness (Mohs scale hardness 9).

To enhance the retention of the abrasive particles in the matrix material MCrAlY, the particles are coated with a first and optionally as well with a second particle coating layer. The first coating layer prevents a separation of the particles from the particle coating. Therefore preferably, the first particle coating layer is formed on the particles by a technique which allows chemical bonding of the layer to the particle surface. The second particle coating layer prevents a separation of the coated particles from the matrix. Therefore, a material is chosen, which binds relatively well to the first particle coating layer and the matrix material.

Hence, with the present invention a coated substrate can be provided with an enhanced lifetime of the abrasive coating compared to the state of the art at elevated temperatures. This enables a protection of turbine blades at temperatures between 900° C. to 1300° C. against wear and oxidation during the whole operation period, which is usually between 24.000 and 36.000 operating hours depending on the other damage mechanism besides oxidation.

Preferably the abrasive particles are single-crystalline. This leads to an enhanced hardness and durability of the particles. The thickness and/or the amount of the abrasive particles in the abrasive coating layer can vary widely, whereby the average particle size can be in the range of 0.1 to 1.000 microns. Preferably, the abrasive particles have an average size between 20 and 150 µm.

The first particle coating layer may consist of or comprise Ti, Zr, Hf, V, Nb, Ta, Cr, Co, Mo, Ni, alloys thereof or a carbide, boride, nitride or oxide thereof. Thereby a sufficient bonding between the particle surface and the particle coating can be achieved. Furthermore, these materials allow chemical bonding of the first particle coating layer to the particle surface as they can form an interstitial layer of metallic carbide or nitride under conventional deposition conditions. The thickness of the first particle coating layer can vary widely. Thicknesses of less 0.1 µm can be used as well as thicknesses well above five µm.

The second particle coating layer can consist of or comprises the same materials as can be used for the first particle coating layer. Preferably the thickness of the second particle coating layer is thicker than the thickness of the first particle coating layer.

If a two-layer coating is chosen, the total mass of the particle coating is preferably in an amount equivalent to 40-95 wt % of the abrasive particles prior to coating. For a single layer coating, the mass of the particle coating is usually smaller and typically in the range from 1-30 wt %.

If the substrate is a single-crystalline superalloy, according to an advantageous aspect of the invention, an intermediate coating layer is disposed between substrate material and the abrasive coating layer. This intermediate coating layer may be epitaxially bonded to the substrate material. The intermediate layer may also consist or comprise a MCrAlY alloy. This intermediate buffer coating layer binds well to the substrate material. If formed epitaxially on a single crystalline substrate material, the intermediate buffer layer has similar anisotropic material properties (e.g. Young's modulus) like the substrate. As a consequence its thermo-physical properties are matched with the substrate leading to higher cyclic lifetime. Epitaxial deposition of the intermediate buffer layer also prevents the formation of grain boundaries and defects. Furthermore, the MCrAlY material of the buffer layer enhances the oxidation resistivity of the substrate material as a crack free, stable and dense protective layer can be formed.

Preferably the matrix material and/or the intermediate coating layer consists of a MCrAlY alloy having a solidification interval between the solidus temperature and liquidus temperature $\Delta T_0$ of less than 50 K. Advantageously it is less than 40 K. This reduces the risk of cracking during solidification. This can be achieved by choosing a MCrAlY alloy which is close to a eutectic composition.

According to a further advantageous aspect of the invention, the matrix material and/or the intermediate coating layer consists of an oxidation-resistant $\gamma/\beta$ or $\gamma/\gamma'$ type MCrAlY alloy, wherein the chemical composition of the alloy is selected such that upon solidification, the $\gamma$ phase is firstly formed and only then the $\beta$ or $\gamma'$ phase is formed. As the $\gamma$ phase is firstly formed, upon solidification on the substrate material, an epitaxial bonded intermediate coating layer can be provided on the substrate material. A particularly advantageous $\gamma/\beta$ type MCrAlY alloy has the following chemical composition: 35-40 wt % Co, 18-24 wt % Cr, 7-9 wt % Al, 0.3-0.8 wt % Y, 0.1-1 wt % Si, 0-2 wt % others, remainder Ni. This alloy has a liquidus temperature of about 1370° C.

The substrate material may consist of a single-crystalline superalloy, which can be precipitation hardened. Commonly, nickel based superalloys are used for turbine blades. Superalloys such as IN713 LC, IN 738 LC, MAR M 247, CM 247 LC, CMSX-4, MK 4 or MD 2 are suitable candidates to be used.

Usually the coating is applied at the radially outer blade tip surface, whereby the weight content of the abrasive particles in the abrasive coating layer may increase towards the radially outer direction.

The task of the invention is also solved by a method for manufacturing a coated substrate according to the present invention. Accordingly, the abrasive coating layer is formed by laser metal forming. This method is disclosed in detail in EP1 476 272 B1, the contents of which are incorporated by reference as if fully set forth. Accordingly, the coated abrasive particles and matrix material particles are mixed in a powder nozzle, transported by a carrier gas and then injected concentrically about the laser beam as a focused jet of powder into the melt pool produced by the laser beam on the blade tip. The laser metal forming process is a welding method and, in contrast to commonly used coating methods, it produces a stable, metallurgical bond with the substrate material without additional diffusion heat treatment.

If the coating also comprises an intermediate layer, the intermediate layer is firstly formed by a suitable coating method. Preferably also laser metal forming is used as it provides an inexpensive and simple method for producing coatings. Moreover, the laser metal forming can be controlled such that it is possible to achieve epitaxial deposition on single crystalline substrates.

According to another advantageous aspect of the invention, the temperature or temperature distribution in the melt pool is additionally recorded online during the laser metal forming process and this information is used by a control system, to control the laser power and thereby the temperature of the melt pool during the laser metal forming such that the temperature of the melt pool during the formation of the abrasive coating layer lies between the liquidus temperature of the substrate material and the melting temperature of the abrasive particles or the melting or liquidus temperature of the first or second particle coating layer. Thereby a very controlled growth of the coating layers with good embedding of the abrasive particles can be achieved.

If the coating also comprises an intermediate layer, the temperature of the melt pool can be controlled such that during the formation of the abrasive coating layer, the temperature lies between the liquidus temperature of the matrix material and the melting temperature of the abrasive particles or of the melting or liquidus temperature of the first or second coating layer.

According to yet another advantageous aspect of the invention, before the formation of the coating, the abrasive particles are coated. In a first step, the first particle coating layer is formed on the abrasive particles. Preferably a method is used, such that the first particle coating layer is chemically bonded to the substrate material. A suitable method is salt bath deposition. In the following optional step the secondary layers can be deposited on the first particle coating layer. A number of techniques such as electroless, electrolytic and vapour deposition techniques can be used to allow the formation of a thick second particle coating layer. Advantageously, electroless deposition is used as a thick coating layer can be produced quickly and inexpensively. The coating can also comprise more than two coating layers. The process of coating these abrasive particles is called metallization.

BRIEF DESCRIPTION OF THE DRAWINGS

The invention is explained in more detail on the basis of exemplary embodiments and on the basis of the FIGS. 1 to 4.

The drawings show.

DETAILED DESCRIPTION OF DIFFERENT EMBODIMENTS OF THE INVENTION

Figure 1:
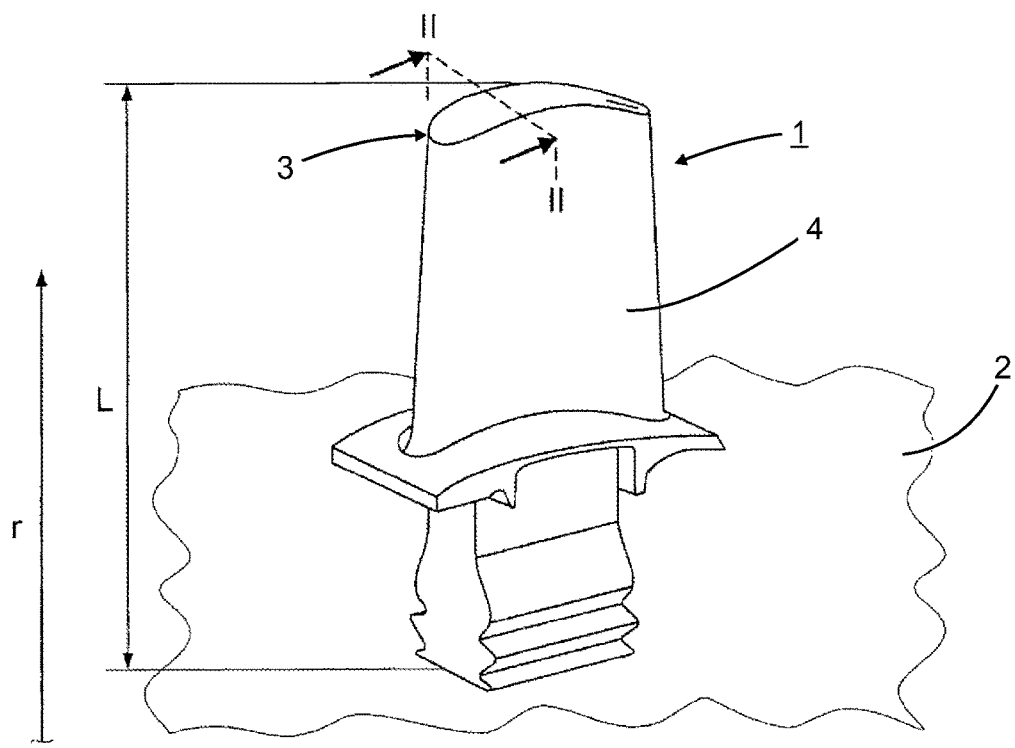
FIG. 1 schematic perspective view of a turbine blade for the rotor of a gas turbine.

FIG. 1 shows a turbine blade 1 for a rotor 2 (shown schematically) of a gas turbine. The turbine blade 1 can have a directionally solidified or a single-crystalline basic body 4, which extends in the radial direction r (in relation to the rotor) with a length L and ends at a radially outer blade tip 3.

Figure 2:
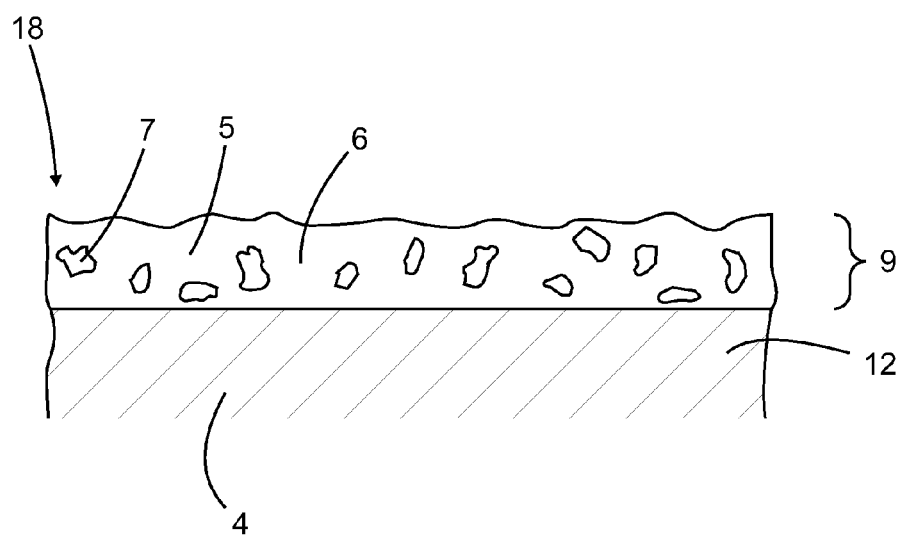
FIG. 2 a schematic side view along line II-II in FIG. 1 of a coated substrate according to an embodiment of the present invention.

According to FIG. 2, the substrate material 12 represented by the basic body 4, is coated with an abrasive coating layer 5. Thus a coated substrate 18 is produced. The coated substrate 18 according to the present application can be a new or a reconditioned turbine blade.

The abrasive coating layer 5 consists of a matrix material 6, which consists of the compound MCrAlY, and of abrasive particles 7 consisting of single-crystalline $\alpha$-$Al_2O_3$, which are embedded in the matrix material 6.

Figure 4:
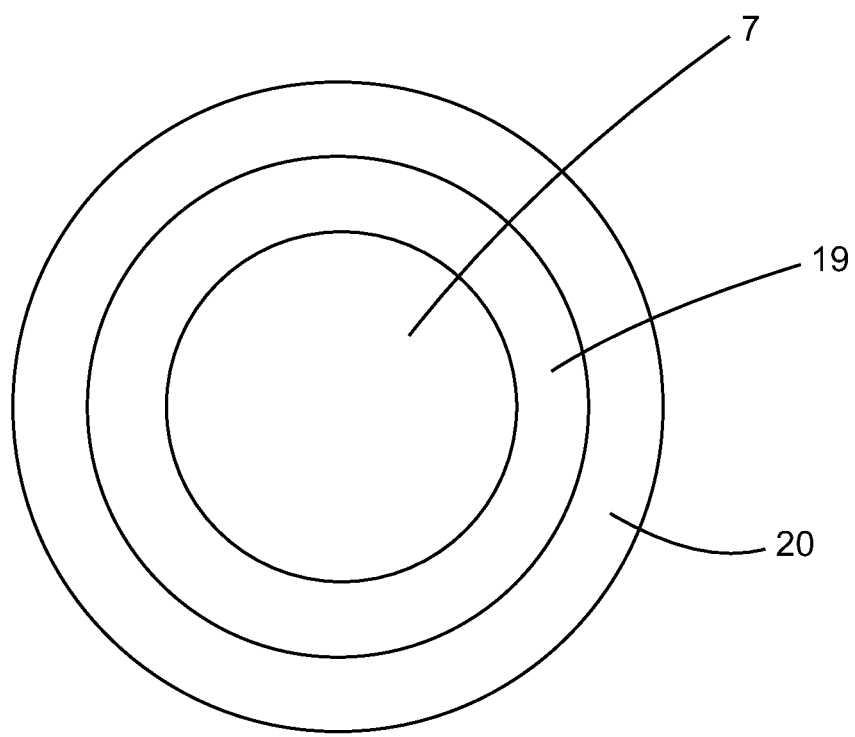
FIG. 4 a schematic side view of a coated abrasive particle.

As schematically shown in FIG. 4, the abrasive particles 7 are coated with a first coating layer 19 consisting e.g. of titanium formed by salt bath deposition disposed on the abrasive particles 7. Optionally, as shown in FIG. 4 a second particle coating layer 20 may be present, e.g. consisting of nickel formed by electroless deposition disposed on the first particle coating layer 19. The basic body 4, which represents the substrate material 12, consists e.g. of IN738C with a liquidus temperature of about 1330° C. and with a melting temperature of titanium coating of the abrasive particles of about 1670° C., which is below the melting temperature of the α-Al$_2$O$_3$ abrasive particles. A suitable melt pool temperature for the laser metal forming process is in this case is 1500° C.+/−100° C.

Figure 3:
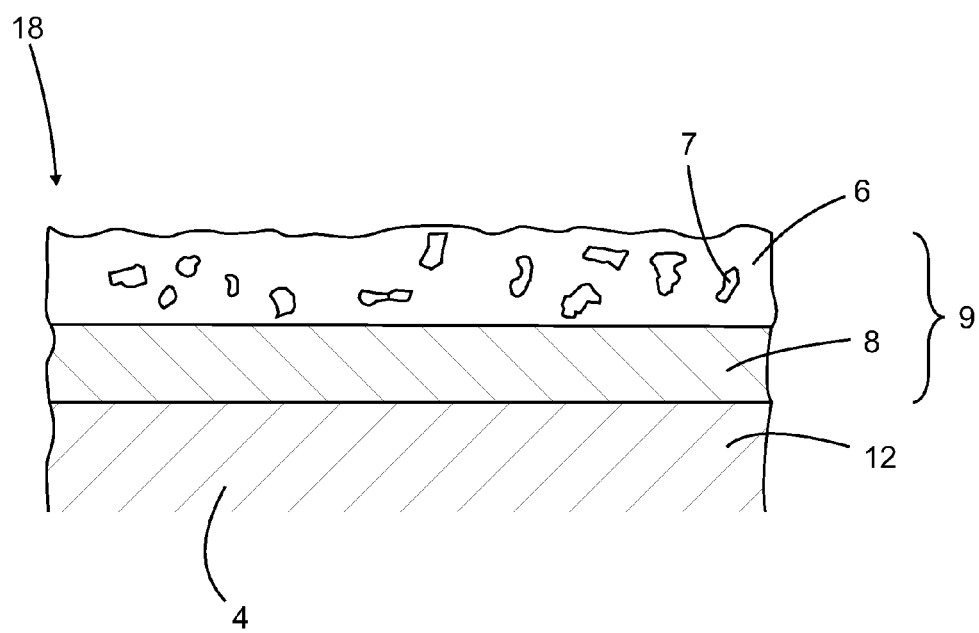
FIG. 3 a schematic side view along line II-II in FIG. 1 of a coated substrate according to another embodiment of the present invention.

According to another embodiment shown in FIG. 3, an intermediate layer 8 is formed on a single-crystalline basic blade body 4 and the abrasive coating layer 5 with abrasive particles 7 in the matrix material 6 is formed on the intermediate layer 8. The intermediate layer 8 consists of the compound MCrAlY. The basic body 4, which represents the substrate material 12, consists of single-crystalline MD2 superalloy (composition: 5-5.25 wt % Co, 7.7-8.3 wt % Cr, 2.0-2.1 wt % Mo, 5.9-6.1 wt % Ta, 7.9-8.3 wt % W, 4.9-5.1 wt % Al, 1.2-1.4 Ti, 0.1-0.12 wt % Si; 0.11-0.13 wt % Hf, 200-250 ppmw C, 50-80 ppmw B, remainder Ni). The MCrAlY matrix material, which has the same composition as the intermediate coating layer, has a solidification interval of smaller than 40 K and upon solidification firstly the γ phase is formed. This material has a liquidus temperature of about 1370° C. In this case, the α-Al$_2$O$_3$ abrasive particles are coated with a first particle coating layer 19 consisting of titanium formed by salt bath deposition and an optional second particle coating layer 20 consisting of a nickel/phosphorous alloy formed by an electroless deposition process. In this case the formation of the abrasive coating layer can be carried out at melt pool temperatures of 1550° C.+/−100° C.

For the formation of the coatings 9 according the FIGS. 2 and 3, the laser metal forming method is used. This method is disclosed in detail in EP 1 476 272 B1. Despite that an epitaxial first coating layer is beneficially, this is not a mandatory requirement for a dual layer abrasive coating.

Figure 5:
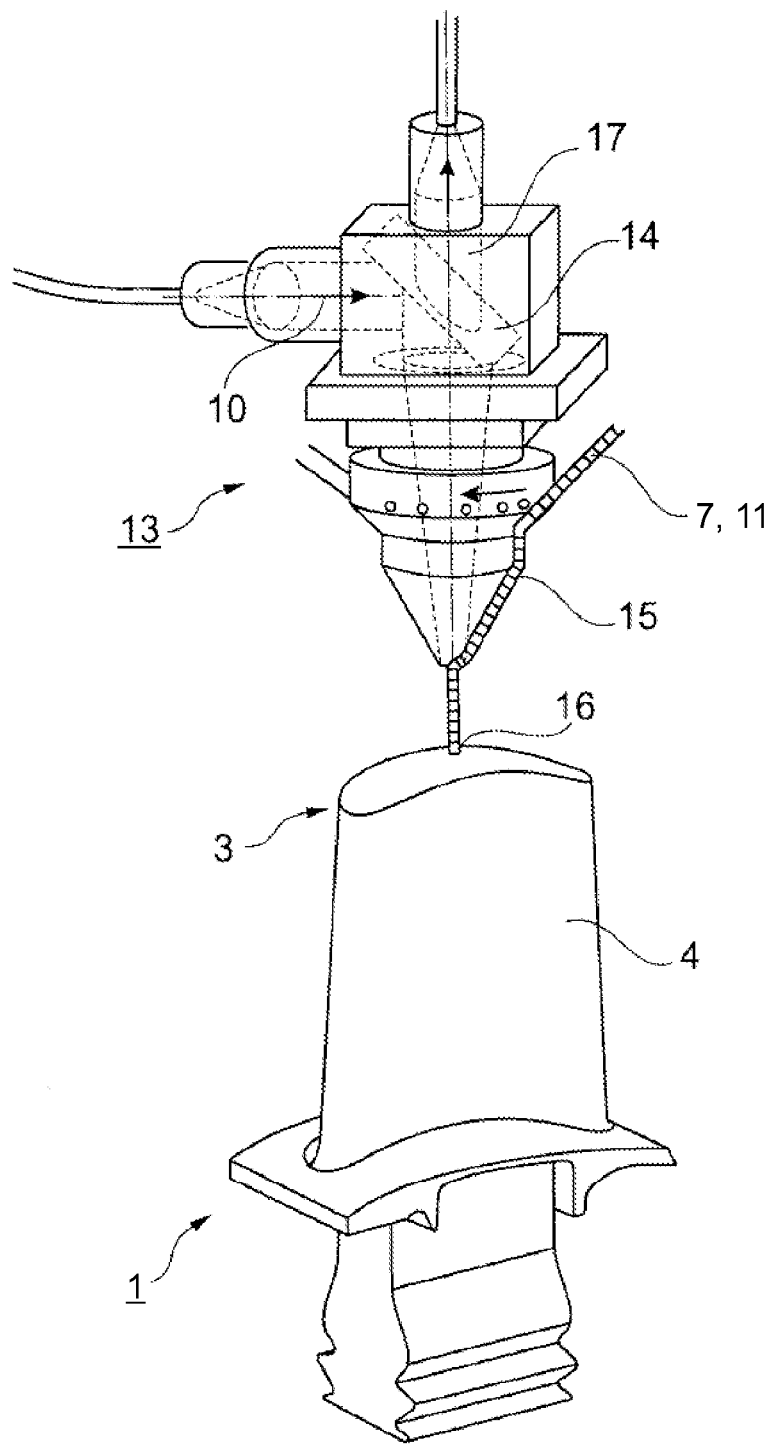
FIG. 5 coating apparatus and the principle of the laser metal forming method.

FIG. 5 shows the coating apparatus 13 for carrying out the laser metal forming method. Accordingly, for the formation of the abrasive coating layer 5, abrasive particles 7 together with the matrix powder particles 11 are coaxially injected via a powder nozzle (not shown), around a focused, high-intensity laser beam 10. A dichroic mirror 14 deflects the high-intensity laser light 10 on to the blade tip 3 and focusses it at a small aiming point, the melt pool 16. The mirror 14 is transparent to the process light which is coupled to an optical parameter (not shown) which makes online control of the temperature of the melt pool 16 possible. The powder particles 7 consisting of the abrasive particles and the matrix material particles are mixed in the powder nozzle, transported by a carrier gas 15 and then injected as a focused jet of powder into the melt pool 16 produced by the laser beam 10 on the blade tip 3 or, if an intermediate layer 8 is present, on the intermediate layer 8. In addition, the temperature or temperature distribution and melt pool is recorded online during the laser metal forming (optical temperature signal 17), and this information is used, with the aid of a control system (not shown) to control the laser power during the laser forming and/or the change of the relative movement of the laser beam 10 and the turbine blade 1 in a controlled manner. By feedback of the temperature signal 17 to the laser controller (not shown), it is possible with the aid of the real-time control process to adapt the laser power automatically.

To produce the coating according to FIG. 3, in a first step the intermediate layer is formed by the laser metal forming method, whereby only intermediate layer powder particles are injected into the melt pool 16. To allow epitaxial solidification of the intermediate layer on a single-crystal base material, the laser power is adapted by the temperature control such that the quotient $G''/v_s$, lies above a material-dependent limit required for directional, single-crystalline solidification. Here, $G''$ denotes the local gradient, $v_s$ denotes the speed of the solidification front and n denotes a further material parameter.

LIST OF REFERENCE NUMERALS 1 blade
2 rotor
3 blade tip
4 basic body
5 abrasive coating layer
6 matrix material
7 abrasive particle
8 intermediate layer
9 coating (total)
10 laser beam
11 matrix powder particles
12 substrate material
13 coating apparatus
14 mirror
15 carrier gas
16 melt pool
17 temperature signal
18 coated substrate
19 first particle coating layer
20 second particle coating layer
L length of position 1
r radial direction

The invention claimed is:

1. A coated substrate comprising:
a substrate material, which is coated at least in part with an oxidation-resistant coating, wherein the oxidation-resistant coating contains a wear-resistant abrasive coating layer, which contains coated abrasive particles embedded in an oxidation-resistant matrix material, wherein at least some of the abrasive particles consist of α-Al$_2$O$_3$ and the abrasive particles are coated with a first particle coating layer disposed on the abrasive particles and an optional second particle coating layer disposed on the first particle coating layer, wherein the matrix material contains a compound MCrAlY, wherein M is at least one element selected from the group consisting of Ni, Co and Fe,
wherein at least some of the abrasive particles are single-crystalline; and
wherein the abrasive particles have an average particle size between 20 and 150 μm.

2. The coated substrate according to claim 1, wherein the first particle coating layer and/or the second particle coating layer contains Ti, Zr, Hf, V, Nb, Ta, Cr, Co, Mo, Ni, alloys thereof or a carbide, boride, nitride or oxide thereof.

3. The coated substrate according to claim 2, wherein the first particle coating layer is chemically bonded to the substrate material.

4. The coated substrate according to claim 2, wherein the matrix material and/or an intermediate coating layer disposed between the substrate material and the abrasive coating layer consists of a MCrAlY alloy having a solidification interval between the solidus temperature and the liquidus temperature $\Delta T_0$ of less than 50 K.

5. The coated substrate according to claim 1, wherein the second particle coating layer is disposed on the first particle coating layer.

6. The coated substrate according to claim 1 wherein the first particle coating layer and/or the second particle coating layer contains Ti, Zr, Hf, V, Nb, Ta, Cr, Co, Mo, Ni, alloys thereof or a carbide, boride, nitride or oxide thereof.

7. The coated substrate according to claim 1, wherein the first particle coating layer is chemically bonded to the substrate material.

8. The coated substrate according to claim 1, wherein the oxidation-resistant coating comprises: at least one intermediate coating layer disposed between the substrate material and the abrasive coating layer, wherein the abrasive coating layer is disposed on at least portions of said intermediate coating layer.

9. The coated substrate according to claim 8, wherein the intermediate coating layer is epitaxially bonded to the substrate material.

10. The coated substrate according to claim 1, wherein the matrix material and/or the intermediate coating layer consists of a MCrAlY alloy having a solidification interval between the solidus temperature and the liquidus temperature $\Delta T_0$ of less than 50 K.

11. The coated substrate according to claim 1, wherein the matrix material and/or the intermediate coating layer consists of an oxidation-resistant γ/ß or γ/γ' type MCrAlY alloy, wherein the chemical composition of the alloy is selected such that upon solidification, the γ phase is firstly formed and only then the ß or γ' phase is formed.

12. The coated substrate according to claim 1, wherein the matrix material and/or the intermediate coating layer consists of an oxidation-resistant γ/ß type MCrAlY alloy having the following chemical composition: 35-40 wt % Co, 18-24 wt % Cr, 7-9 wt % Al, 0.3-0.8 wt % Y, 0.1-1 wt % Si, 0-2 wt % others, remainder Ni.

13. The coated substrate according to claim 1, wherein the substrate material consists of a single-crystalline superalloy.

14. The coated substrate according to claim 1, wherein the substrate material is a radially extending turbine blade for a turbine rotor, wherein the oxidation-resistant coating is applied at the radially outer blade tip surface.

15. The coated substrate according to claim 14, wherein the weight content of the abrasive particles in the abrasive coating layer increases in the radial direction.

16. A method for manufacturing a coated substrate according to claim 1, wherein the wear-resistant abrasive coating layer is formed by laser metal forming.

17. A method according to claim 8 wherein firstly the intermediate layer is formed and secondly the abrasive coating layer is formed by laser metal forming.

18. A method according to claim 17, wherein a temperature or temperature distribution in a melt pool is recorded during the formation of the abrasive coating layer to control the laser power such that the temperature of the melt pool during the formation of the abrasive coating layer lies between the liquidus temperature of the matrix material and the melting temperature of the abrasive particles or of the melting or liquidus temperature of the first or second particle coating layer.

19. A method according to claim 16, wherein a temperature or temperature distribution in a melt pool is recorded during the formation of the abrasive coating layer to control the laser power such that the temperature of the melt pool during the formation of the abrasive coating layer lies between the liquidus temperature of the substrate material and the melting temperature of the abrasive particles or of the melting or liquidus temperature of the first or second particle coating layer.

20. A method according to claim 16, wherein in a preceding step to forming the abrasive coating layer by laser metal forming, the abrasive particles are coated, wherein this step comprises the following sub-steps:
 a) forming the first particles coating layer on the abrasive particles by salt bath deposition, and optionally
 b) forming of the second particle coating layer on the first particles coating layer by electroless deposition.

* * * * *